United States Patent Office 3,510,311
Patented May 5, 1970

3,510,311
DRY CARBONATED COLA BEVERAGE COMPOSITION
Robert L. Swaine, Lynnfield, and Donna W. Beusch, Cambridge, Mass., assignors to William C. Clay, Jr., Mount Sterling, Ky.
No Drawing. Filed July 13, 1965, Ser. No. 471,706
Int. Cl. A23l 1/00
U.S. Cl. 99—78   2 Claims

ABSTRACT OF THE DISCLOSURE

A dry carbonated cola beverage composition comprising a powder which forms a carbonated cola flavored beverage on admixture with water. The composition consists essentially of from 30 to 38 weight percent of sodium bicarbonate, from 39 to 48 weight percent of anhydrous citric acid, from 1.0 to 2.3 weight percent cyclohexylsulfamic acid, from 0.0056 to 0.112 weight percent of disodium inosinate, from 0.0044 to 0.088 weight percent of disodium guanylate, from 4 to 6 weight percent of a mixture of sodium cyclamate and sodium saccharine in stated ratios, from 0.03 to 0.6 weight percent of spray dried cola flavoring, from 0.2 to 0.6 weight percent of spray dried cinnamon, and from 0.4 to 0.8 weight percent of vanilla powder.

---

The present invention is directed to a dry carbonated cola beverage composition, and more particularly to a composition which may be stored in the powdered state and admixed by the user with water to form a carbonated beverage.

In recent years, there has been a marked increase in the use of dry carbonated beverages. Such beverages have numerous advantages over liquid carbonated beverages. Thus, the use of glass or other bulky containers is avoided, the necessity for bottling, shipping, and storing beverages consisting of high weight percentages of water is eliminated, and the utility in terms of portability by the user is greatly enhanced. Thus, mobile units, campers, etc. are not required to transport bulky and heavy quantities of carbonated beverages.

Virtually all of the commercial dry carbonated beverage powders are based on a sodium bicarbonate-citric acid mixture, with the carbon dioxide being released by the interaction of the citric acid and the sodium bicarbonate. Unfortunately, the sodium bicarbonate-citric acid system adversely affects cola flavorings. As a result, until the advent of the present invention, it was not possible to produce a carbonated cola flavored beverage from a dry powder composition that possessed a satisfactory cola flavor. Attempts have been made to solve the problem by modifying the cola flavor. However, this has not proved to be satisfactory.

This invention has an object the provision of a novel dry carbonated cola beverage.

This invention has as an object the provision of a dry carbonated cola beverage which may be stored for extended periods without change in flavor.

This invention has an another object the provision of a dry carbonated cola beverage having an excellent cola flavor when the dry powder is mixed with water.

Other objects will appear hereinafter.

These objects are accomplished by the beverage composition of the present invention which comprises a dry blend of sodium bicarbonate, citric acid, cyclohexylsulfamic acid, sodium cyclamate, sodium saccharin, disodium inosinate, disodium guanylate, vanilla powder, cola flavoring, and cinnamon.

The sodium bicarbonate should be present in the range of from 30 to 38 weight percent, and preferably about 36 weight percent. The citric acid should be present as anhydrous citric acid in the range of 39 to 48 weight percent, and preferably about 46 weight percent. If the low concentration range of the citric acid is used, such as about 39 weight percent, then the citric acid should be reinforced with up to about 4 weight percnt of sodium citrate, so that the combined weight percentage of citric acid and sodium citrate totals about 43 weight percent.

The cyclohexylsulfamic acid should be present within the range of about 1.0 to 2.3 weight percent, and preferably about 1.6 weight percent. The cyclohexylsulfamic acid is used to add and to blend sweet and sour, and to produce a clearer washout of flavor.

Both the sodium cyclamate and sodium saccharin should be present in the mixture. Having both present minimizes after-taste. The total weight percentage for the mixture of sodium cyclamate and sodium saccharin should be between 4 to 6 weight percent, with the optimum being about 5.75 weight percent based on the total mixture. The relative ratio of sodium cyclamate to sodium saccharin may vary within the range of from 10 to 37 parts by weight of sodium cyclamate to 1 part by weight of sodium saccharin. The optimum relative ratio is about 32 parts by weight of sodium cyclamate per part by weight of sodium saccharin.

The disodium inosinate is a flavor potentiator. Thus, its presence insures a greater flavor effect from the cola flavoring than can be achieved in its absence, although at the level used it contributes no flavor of its own. The disodium inosinate should be present in the mixture in concentration of from 0.0056 weight percent to 0.112 weight percent, with an optimum concentration of about 0.01848 weight percent.

The disodium guanylate is also a flavor potentiator. It should be present in the amount of from 0.0044 weight percent to 0.088 weight percent, and preferably about 0.01452 weight percent.

We have discovered that the presence of the disodium inosinate and the disodium guanylate gives the user the feeling of a viscous product in the mouth without physically affecting the product's viscosity.

The vanilla powder should conform to the standards set forth in 21 Code of Federal Regulations 22.8, as amended at 28 Federal Register 9983, effective Dec. 12, 1962. The vanilla powder should be present in a concentration range of 0.4 to 0.8 weight percent, and preferably about 0.67 weight percent. The vanilla powder blends the other components and gives a smooth effect.

A dry cola flavoring should be used. A number of these dry cola flavorings are commercially available. However, if desired, the cola flavoring set forth at page 264 of Food Flavorings by Joseph Merory (Avi Publishing Company, 1960) can be used if spray dried. Thus, the cola flavor MF 212 set forth by Merory should be spray dried to a powder. This cola flavoring is as follows:

|  | Fluid oz. |
|---|---|
| Cola nut extract, formula MF 211 | 12.0 |
| Vanilla extract two-fold, formula MF 64, and solution of: 2.0 oz. av. caffein | 2.0 |
| and |  |
| Water | 10.0 |
| Glycerin | 16.0 |
| Lime juice | 32.0 |
| Caramel, acid proof | 32.0 |
| Cola flavor base of formula MF 209 | 12.0 |
| Alcohol, 95 percent | 12.0 |

The spray dried cola flavoring should be present in the weight percentage range of 0.03 to 0.6 weight percent based on the entire composition, and preferably about 0.53 weight percent.

The spray dried imitation or natural cinnamon may be used. This should be present in the weight percentage concentration of 0.2 to 0.6 weight percent, and preferably about 0.33 weight percent.

While the above components are essential, it is desirable to have caramel color present for color, such as within the range of 2.5 to 7.0 weight percent, and preferably about 6 weight percent.

In addition, it is desirable to have from 1.4 to 2.0 weight percent of powdered tribasic calcium phosphate present to keep the mixture free-flowing and prevent caking.

We have also found that up to 15 weight percent of D-mannitol may be added. The mannitol will serve to smooth out the flavor of the composition.

The compositions of the present invention are preferably made by dissolving all of the components in isopropanol, and then granulating the mixture while driving off the isopropanol. The mixture should be dried until all moisture is removed at a temperature of the order of 140° F. in a hot air oven. The use of the technique of dissolving all of the components in isopropanol has the advantage of preventing layering, which may be present if spray dry flavors are mechanically mixed.

A very satisfactory cola flavored carbonated beverage is obtained when 3 grams of the composition of the present invention are mixed with 6 ounces of water.

In order to illustrate the composition of the present invention there is set forth the following example:

| Component: | Weight percent |
|---|---|
| Sodium bicarbonate U.S.P. | 30.79 |
| Anhydrous citric acid | 39.19 |
| Sodium citrate | 4.2 |
| D-mannitol | 14.0 |
| Sodium cyclamate | 4.65 |
| Sodium saccharin | 0.13 |
| Vanilla powder | 0.56 |
| Caramel color | 2.8 |
| Disodium inosinate | 0.0784 |
| Disodium guanylate | 0.0616 |
| Tribasic calcium phosphate | 1.4 |
| Cyclohexylsulfamic acid | 1.4 |
| Cola flavor | 0.16 |
| Dry cinnamon | 0.56 |

In place of the sodium cyclamate and sodium saccharin, an equivalent amount of sucrose may be used. However, the use of sodium cyclamate and sodium saccharin is to be preferred.

In the above example, the optimum concentrations were not used in order to illustrate the variation within the ranges heretofore given.

We claim:

1. In a dry carbonated cola beverage composition comprising a powder which forms a carbonated cola flavored beverage on admixture with water and which contains from 30 to 38 weight percent of sodium bicarbonate, from 39 to 48 weight percent of anhydrous citric acid, from 1.0 to 2.3 weight percent cyclohexylsulfamic acid, from 4 to 6 weight percent of a mixture of sodium cyclamate and sodium saccharine in which the ratio of sodium cyclamate to sodium saccharine is from 10 to 37 parts of sodium cyclamate per part of saccharine, from 0.03 to 0.6 weight percent of spray dried cola flavoring, from 0.2 to 0.6 weight percent of spray dried cinnamon, and from 0.4 to 0.8 weight percent of vanilla powder, the improvement consisting essentially of from 0.0056 to 0.112 weight percent of disodium inosinate and from 0.0044 to 0.088 weight percent of disodium guanylate in the composition, such disodium inosinate and disodium guanylate conferring on the carbonated cola flavor beverage resulting from admixture of the composition with water, a feeling to the user of a viscous product in the mouth without physically affecting the product's viscosity.

2. A composition in accordance with claim 1 which contains from 2.5 to 7.0 weight percent of caramel color and from 1.4 to 2.0 weight percent of calcium phosphate tribasic.

References Cited

UNITED STATES PATENTS

| 2,851,361 | 9/1958 | Diller | 99—78 |
| 3,082,091 | 3/1963 | Smith | 99—78 |
| 3,104,171 | 9/1963 | Sakaguchi et al. | 99—140 |

A. LOUIS MONACELL, Primary Examiner

S. B. DAVIS, Assistant Examiner

U.S. Cl. X.R.

99—28, 140